(12) United States Patent
Atkins et al.

(10) Patent No.: US 10,712,752 B2
(45) Date of Patent: *Jul. 14, 2020

(54) HIGH AUTHORITY STABILITY AND CONTROL AUGMENTATION SYSTEM

(71) Applicant: Bell Helicopter Textron Inc., Fort Worth, TX (US)

(72) Inventors: Brady G. Atkins, Fort Worth, TX (US); James E. Harris, Arlington, TX (US); Carl D. Griffith, Colleyville, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/872,651

(22) Filed: Jan. 16, 2018

(65) Prior Publication Data

US 2018/0157275 A1 Jun. 7, 2018

Related U.S. Application Data

(63) Continuation of application No. 14/284,045, filed on May 21, 2014, now Pat. No. 9,870,004.

(51) Int. Cl.
*G05D 1/08* (2006.01)
*G05D 1/00* (2006.01)
(Continued)

(52) U.S. Cl.
CPC ......... *G05D 1/0833* (2013.01); *B64C 13/341* (2018.01); *B64C 27/58* (2013.01); *G05D 1/0077* (2013.01)

(58) Field of Classification Search
CPC .......... B64C 2027/7283; B64C 27/001; B64C 27/615; B64C 13/341; B64C 27/58; G05D 1/0833; G05D 1/0077
(Continued)

(56) References Cited

U.S. PATENT DOCUMENTS

| 3,733,039 A | 5/1973 | O'Connor |
| 5,189,620 A | 2/1993 | Parsons et al. |

(Continued)

FOREIGN PATENT DOCUMENTS

| EP | 0313899 A2 | 5/1989 |
| EP | 1037130 A2 | 9/2000 |

(Continued)

OTHER PUBLICATIONS

Partial European Search Report from corresponding European application No. 14196198.7 from the EPO dated Apr. 23, 2015.
(Continued)

*Primary Examiner* — Khoi H Tran
*Assistant Examiner* — Rodney P King
(74) *Attorney, Agent, or Firm* — James E. Walton

(57) ABSTRACT

A system and method of increasing the control authority of redundant stability and control augmentation system (SCAS) actuators by utilizing feedback between systems such that one system may compensate for the position of a failed actuator of the other system. Each system uses an appropriate combination of reliable and unreliable inputs such that unreliable inputs cannot inappropriately utilize the increased authority. Each system may reconfigure itself when the other system actuator fails at certain positions so that the pilot or other upstream input maintains sufficient control authority of the aircraft.

15 Claims, 3 Drawing Sheets

(51) Int. Cl.
*B64C 13/28* (2006.01)
*B64C 27/58* (2006.01)

(58) Field of Classification Search
USPC .......................................................... 701/3
See application file for complete search history.

(56) References Cited

U.S. PATENT DOCUMENTS

| | | | |
|---|---|---|---|
| 5,678,786 A | 10/1997 | Osder | |
| 2007/0164166 A1 | 7/2007 | Hirvonen | |
| 2008/0237392 A1* | 10/2008 | Piasecki | B64C 27/26 244/6 |
| 2009/0152404 A1 | 6/2009 | Yount | |
| 2010/0084517 A1 | 4/2010 | Benson et al. | |
| 2010/0319341 A1 | 12/2010 | Blitz et al. | |
| 2011/0264242 A1 | 10/2011 | Nakagawa et al. | |

FOREIGN PATENT DOCUMENTS

| | | | |
|---|---|---|---|
| WO | 2007018652 A1 | 2/2007 | |
| WO | 2010096104 A1 | 8/2010 | |

OTHER PUBLICATIONS

European Search Report from corresponding European application No. 14196198.7 from the EPO dated Aug. 28, 2015.
Examination Report from corresponding European Application No. 14196198.7 from the EPO dated Sep. 14, 2015.
Examination Report from corresponding European application No. 14196198.7 from the EPO dated Feb. 26, 2016.
Examination Report from corresponding European application No. 14196198.7 from the EPO dated Aug. 11, 2016.
Partial European Search Report from Corresponding European application No. 17155735.8 from the EPO dated May 22, 2017.
Examination Report from Corresponding European application No. 17155735.8 from the EPO dated Sep. 5, 2017.
European Office Action from corresponding European application No. 17155735.8 from the EPO dated Dec. 14, 2018.

* cited by examiner

HIGH AUTHORITY STABILITY AND CONTROL AUGMENTATION SYSTEM

BACKGROUND

1. Field of the Invention

The present application relates generally to flight control systems, and more specifically, to an aircraft flight control system for allowing an augmentation system to have higher authorities, for example up to full authority, on an aircraft that has a mechanical flight control system.

2. Description of Related Art

Previous attempts to provide higher authority on Stability and Control Augmentation Systems (SCAS) have relied upon mechanical limits. For example, some SCAS actuators are mechanically limited in authority to mitigate the effects of a failure resulting in actuator seizure or undesired motion. Other SCAS actuators use spring mechanisms to center the SCAS actuators upon a failure. Actuator authority is limited mechanically to mitigate the effects of undesired motion resulting from a failure including the sudden recentering which will result if a failure occurs while the actuator is working near its extreme position. None of the previous attempts provide high authority.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
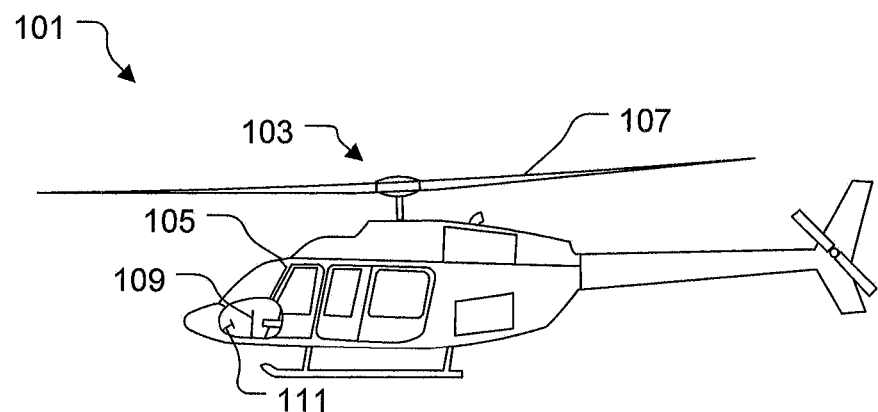
FIG. 1 is a side view of a rotary aircraft.

While the system and method of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

The system and method of the present application overcomes the abovementioned limitations commonly associated with conventional SCAS actuators. The system improves optionally manned aircraft by fixing the input controls and using the SCAS with high authority to control the aircraft in flight. Further description and illustration of the high authority stability and control system and method is provided in the figures and disclosure below.

It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings, FIG. 1 shows a rotary aircraft utilizing the flight control system of the present application. FIG. 1 shows a side view of a helicopter 101. However, it will be appreciated that the control system is easily and readily adaptable for use with other types of rotary aircraft, i.e., helicopter 101, operating at various speeds and with or without a fixed lateral cyclic control.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107, thus providing lateral and longitudinal flight direction, and/or manipulate pedals 111 for controlling yaw direction. Helicopter 101 includes a dual Automatic Flight Control System (AFCS).

For ease of description, some of the required systems and devices operably associated with the present control system are not shown, i.e., sensors, connectors, power sources, mounting supports, circuitry, software, and so forth, in order to clearly depict the novel features of the system. However, it should be understood that the system of the present application is operably associated with these and other required systems and devices for operation, as conventionally known in the art, although not shown in the drawings.

Figure 2:
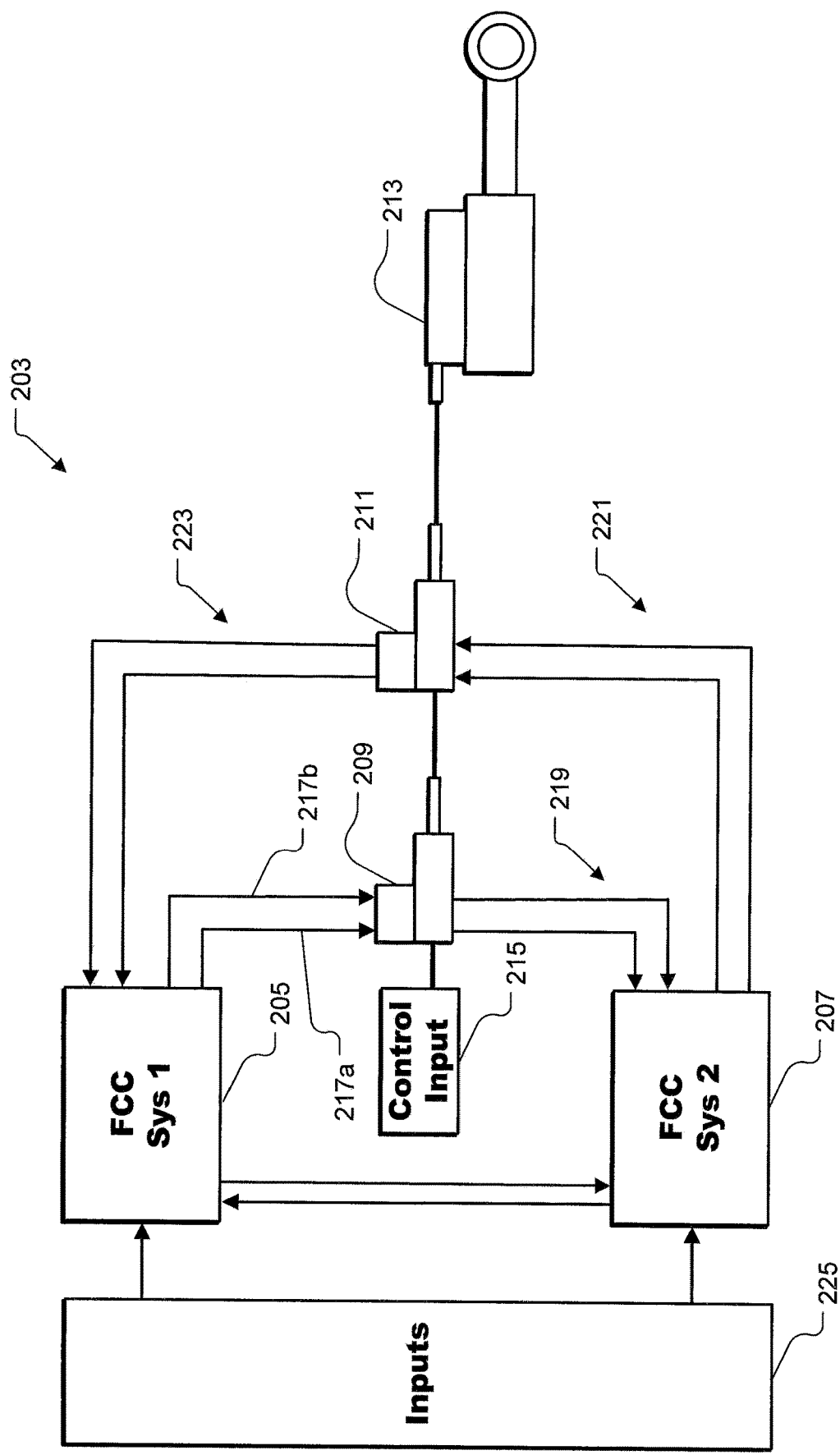
FIG. 2 is a schematic of the high authority stability and control augmentation system according to the preferred embodiment of the present application.

Referring now also to FIG. 2 in the drawings, a schematic of a high authority stability and control augmentation system 203 is shown. The high authority stability and control augmentation system 203 allows for significantly enhanced aircraft automation by allowing an augmentation system to have higher authorities (up to full authority) on an aircraft that has a mechanical flight control system. The high authority stability and control augmentation system 203 is comprised of a first flight control computer (FCC) 205, a second FCC 207, a first actuator 209 typically a SCAS actuator, a second actuator 211 typically a SCAS actuator, and a flight control actuator 213. As typical between FCC's the first FCC 205 is in communication with the second FCC 207.

First actuator 209 is summed with second actuator 211 which both are summed with input 215. The summation can be mechanical, for example, the actuators can move a control rod. Alternatively, the summation can be electrical, for example, a digital or analog signal of the actuators can be summed together with other signals. Preferably, input 215 is from the pilot input into the controls, such as lateral or longitudinal cyclic controls 109; however other upstream inputs to the aircraft control axis, such as trim actuators are contemplated by this application. It should be apparent that each axis of control requires a dual system (System 1 and System 2) 203 and that for clarity sake only a single axis of controls is shown. Furthermore, each system (1 and 2), at least in regard to flight critical functionality such as rate sensor inputs, processing, and output monitoring, may be dual and self-checking. Any disagreement within either system can allow that system to shut down its associated SCAS actuator and therefore no single failure would result in erroneous movement of the SCAS actuator. Rather, single failures within either system would result in the SCAS actuator associated with the failed system holding fixed in position. First actuator 209 is dual commanded from the first FCC 205 by a first command 217a and a second command 217b each being sourced from one of two self checking processors within the first FCC 205. First actuator 209 is smart and also self checking and therefore can compare the first command 217a to the second command 217b and can use other means to otherwise monitor the health of the commanding FCCs outputs. In one embodiment, first actuator 209 provides dual status and positional feedback 219 to the second FCC 207. While comparing first command 217a to the second command 217b, if the first actuator 209 senses a significant disagreement between the first command 217a and the second command 217b or any other indication of failures of the commanding FCC such as lack of command updates, the actuator 209 fails itself fixed in place. If the first actuator 209 fails fixed in place the second FCC 207 may then compensate for the fixed position of the first actuator 209 by changing its commands to second actuator 211. For example, as long as the first actuator 209 is working properly the status signals 219 are held to a high voltage. If the first actuator 209 fails the status signals 219 are driven low. The second FCC 207 receiving the failed status 219 from the first actuator 209 and utilizing the last known position information 219, may command the second actuator 211 to a different position to mitigate the failed position of the first actuator 209 so that the control input 215 retains sufficient control authority of the aircraft. Second actuator 211 is dual commanded 221 from the second FCC 207. Second actuator 211 provides dual status and positional feedback 223 to the first FCC 205. Inputs 225 to first FCC 205 and to second FCC 207 are comprised of typical inputs to FCCs such as: positional information from the controls via displacement transducers; attitudes and attitude rates; pitch rates; airframe accelerations; airspeed; engine parameters; rotor parameters; and transmission parameters. Similarly to above, if the second actuator 211 fails, the first FCC 205 then compensates for the failed second actuator 211.

Figure 3A:
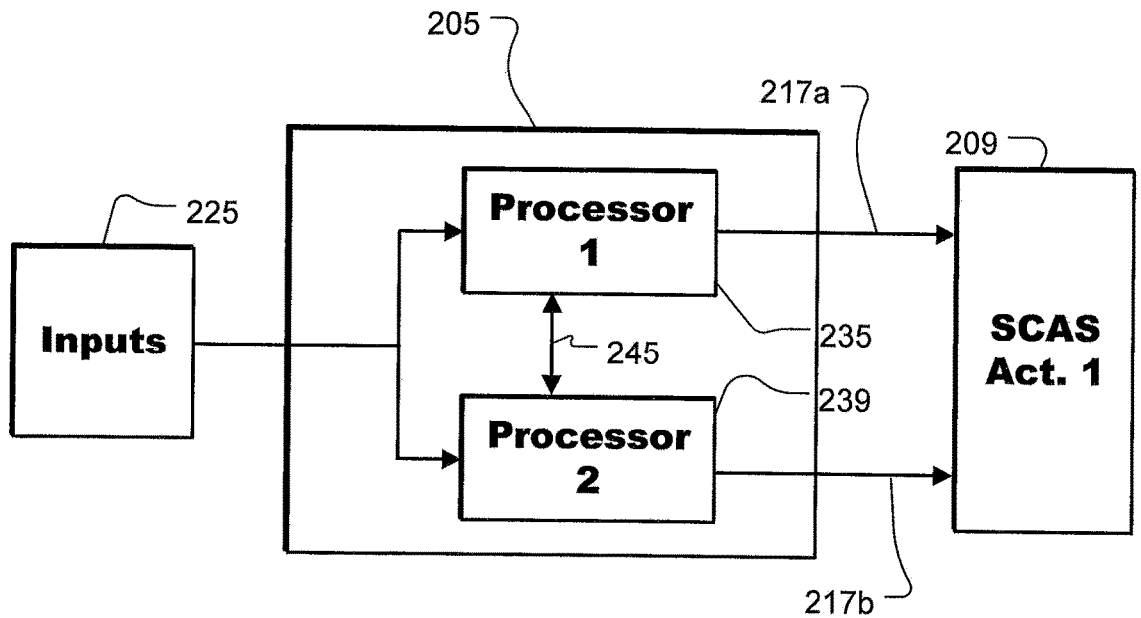
FIG. 3a is a schematic of the flight control system according to the preferred embodiment of the present application.

Referring now also to FIG. 3a in the drawings, a schematic of an improved FCC 205 having a high authority stability and control augmentation system 203 is illustrated. The first FCC 205 includes a first processor 235 and a second processor 239. First processor 235 provides the first command 217a to the first actuator 209, and the second processor 239 provides the second command 217b to the first actuator 209. The two processors compare their respective interpretations of inputs 225 and computed outputs 217a and 217b. Any disagreement, will force SCAS actuator 1 to fail fixed. In one embodiment, this can be accomplished by sending commands that are recognized by the first actuator 209 as commands to fail fixed.

In the preferred embodiment the SCAS actuators are SMART and compare the first command to the second command. In an alternative embodiment the FCCs control the position of the SCAS actuators directly and status and position feedback to the other system is therefore sourced from the FCCs. In such case, the internal redundant configuration of the SCAS actuators would be accomplished within the redundant configuration of the FCCs.

Figure 3B:
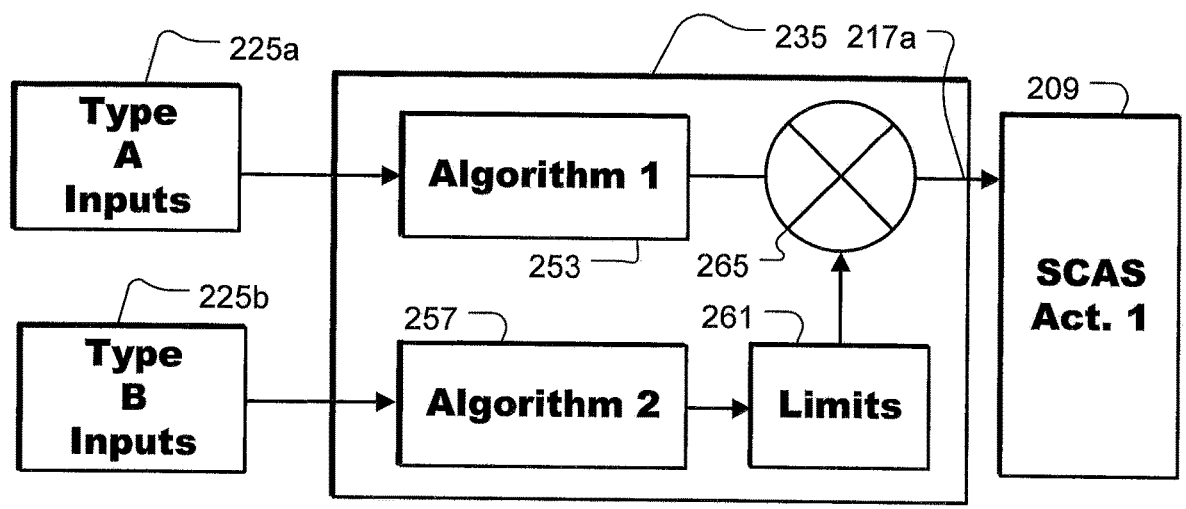
FIG. 3b is a schematic of the processor according to the preferred embodiment of the present application.

Referring now also to FIG. 3b in the drawings, a schematic of the algorithms implemented within each processor 235 and 239 is illustrated. Located inside each processor 235 and 239 are a first set of computational algorithms 253, a second set of computational algorithms 257, limits 261, and a summation 265. Preferably computational algorithms 253 are software based however in an alternative embodiment computational algorithms 253 are comprised of analog hardware monitoring and responding to inputs 225. Limits 225 are grouped into trusted inputs and into un-trusted inputs. The first computational algorithms 253 utilize input type 225a or trusted inputs. Input type 225a consists of inputs that are monitored sufficiently and robustly enough to guarantee the validity of the data supplied to the first computational algorithm 253. Examples of monitored inputs 225a include attitude rates and pitch rates. First computational algorithm 253 determines a part of the actuator command 217a dependent upon the specific input from the input type 225a. For example the first computational algorithm 253 adjusts the actuator command 217a based upon a falling attitude rate. Input types 225b or un-trusted inputs are inputs that are not necessarily reliable and are supplied to the second set of computational algorithms 257. An example of an unreliable input 225b may be airspeed. Second computational algorithm 257 determines a part of the actuator command 217a dependent upon the specific input from the input type 225b. Limits 261, limit the contribution of the output of the second set of computational algorithms 257 to the actuator commands 217a and 217b. Limit 261 is configured to limit the unreliable input 225b to a magnitude that has been determined safe for the helicopter 101 were it to be incorrect data. In another embodiment, limits to inputs 225b may exist prior to computational algorithms 257. In yet another embodiment, additional computational algorithms may exist at the output of the summing element 265. It is the appropriate combination of these two classes of inputs 225a and 225b that allow the system 203 the advantages resulting from higher authority while maintaining safety.

When the actuator in one system fails as a fixed position, the remaining system, based on the status and position feedback from the failed system, may configure new position command limits such that any subsequent failure in the remaining system would result in a net position in which the sum of both actuator positions is within a range sufficient for the pilot or other upstream input to retain sufficient control of the aircraft. Upon detection of the first failure, the remaining system may act to command the unfailed actuator to within the newly established limits if necessary to accomplish the objective.

The system and method described herein solves the limitation of limited automatic control authority by incorporating feedback, mitigation algorithms, and computation limiting to a traditional mechanically limited dual system.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method for increasing the authority of a stability and control augmentation system, comprising:
    providing a first actuator;
    grouping robust inputs into a first group of inputs;
    grouping non-robust inputs into a second group of inputs;
    processing the first group of inputs into trusted commands for the actuator;
    processing the second group of inputs into un-trusted commands for the actuator;
    providing a set of limits for the un-trusted commands;
    limiting the contribution of the un-trusted commands based on the set of limits to form limited un-trusted commands; and
    summing the trusted commands with the limited un-trusted commands,
    wherein the robust inputs are monitored.

2. The method according to claim 1, wherein the step of summing the trusted commands with the limited un-trusted commands is utilized to move the first actuator.

3. The method according to claim 1, wherein the robust inputs are attitude rates.

4. The method according to claim 1, wherein the robust inputs are pitch rates.

5. The method according to claim 1, wherein the non-robust inputs are airspeeds.

6. A rotary aircraft having a rotary system carried by a fuselage, the rotary system comprising:
    a first flight control computer carried by the fuselage, the first flight control computer having;
        a first processor for commanding a first actuator along a first axis; and
        a second processor for commanding the first actuator along the first axis;
    a second flight control computer carried by the fuselage;
    a first actuator commanded by the first flight control computer for manipulating the rotary system along the first axis;
    a second actuator commanded by the second flight control computer for manipulating the rotary system along the first axis; and
    a third actuator for manipulating the rotary system along the first axis;
    wherein the first actuator compares commands from the first processor of the first flight control computer to commands from the second processor of the first flight control computer to find a failure in the first actuator; and
    wherein an output of the first actuator is summed with an output of the second actuator and summed with a control input for manipulating the rotary system with full authority in only the first axis by controlling the third actuator.

7. The rotary aircraft according to claim 6, wherein the first and second processors in the first flight control computer group inputs by reliability.

8. The rotary aircraft according to claim 7, wherein the first actuator is limited by unreliable inputs.

9. The rotary aircraft according to claim 6, wherein the failure in the first actuator forces the first actuator fixed.

10. The rotary aircraft according to claim 9, wherein the second actuator adjusts automatically due to, the failure in the first actuator.

11. A rotary aircraft having a rotary system carried by a fuselage, the rotary system comprising:
    a first flight control computer carried by the fuselage, the first flight control computer having;
        a plurality of processors;
    a second flight control computer carried by the fuselage, the second flight control computer having;
        a plurality of processors;
    a first actuator commanded by the first flight control computer for manipulating the rotary system along a first axis;
    a second actuator commanded by the second flight control computer for manipulating the rotary system along the first axis; and
    a third actuator for manipulating the rotary system along the first axis;
    wherein the first actuator compares commands between the processors of the first flight control computer to find a failure in the first actuator; and
    wherein an output of the first actuator is summed with an output of the second actuator and summed with a control input for manipulating the rotary system with full authority in only the first axis by controlling the third actuator.

12. The rotary aircraft according to claim 11, wherein the plurality of processors in the first flight control computer group inputs by reliability.

13. The rotary aircraft according to claim 12, wherein the first actuator is limited by unreliable inputs.

14. The rotary aircraft according to claim 12, wherein the second actuator adjusts automatically due to the failure in the first actuator.

15. The rotary aircraft according to claim 11, wherein the failure in the first actuator forces the first actuator fixed.

* * * * *